April 25, 1961 C. W. VAN RANST 2,981,373
GEAR DRIVE
Filed Nov. 5, 1958 2 Sheets-Sheet 1
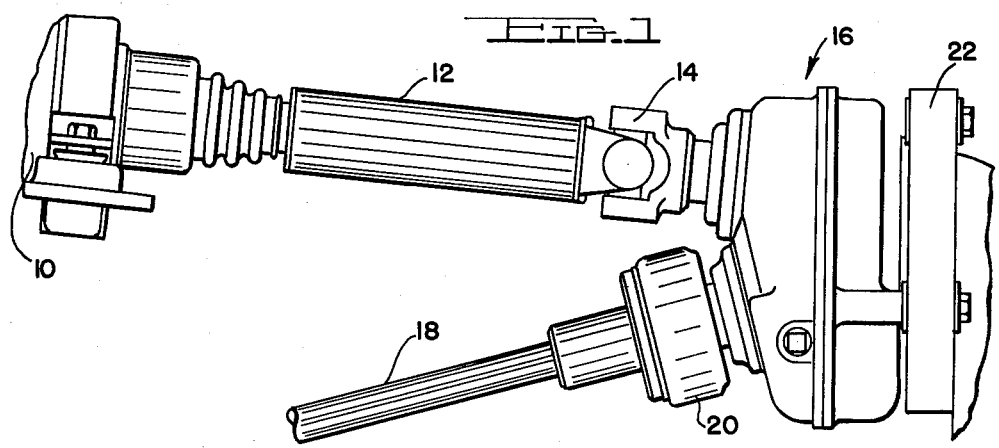
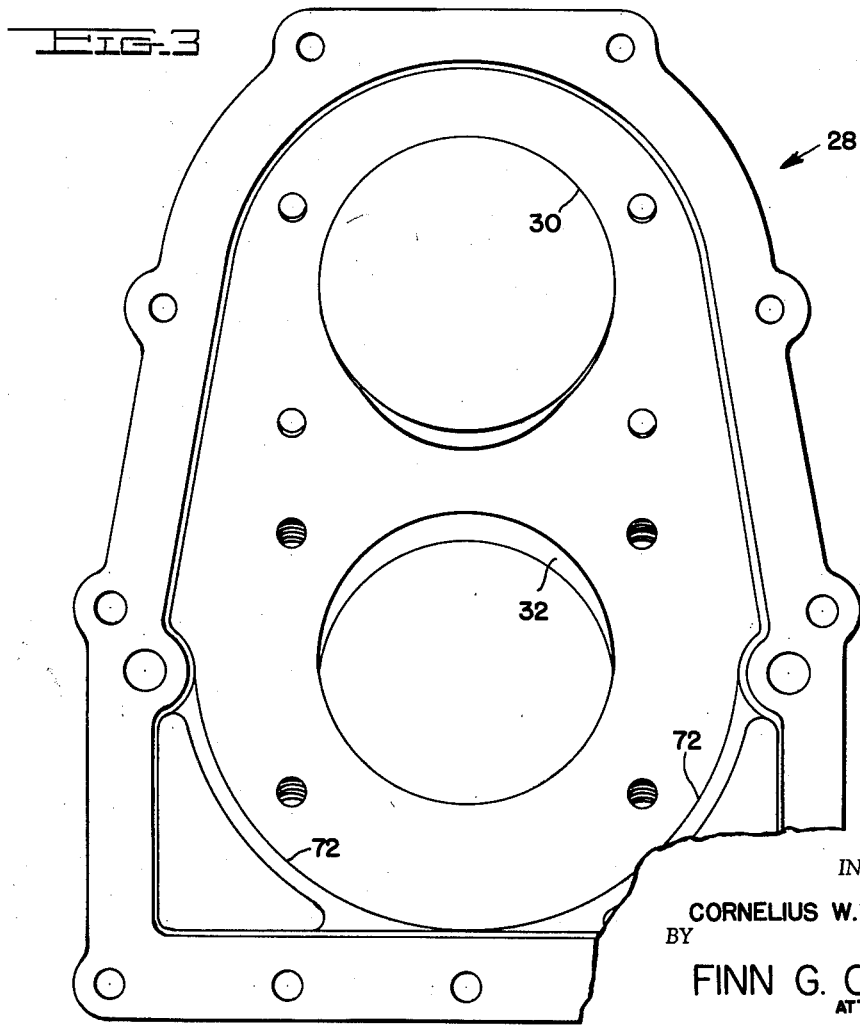
INVENTOR.
CORNELIUS W. VAN RANST
BY
FINN G. OLSEN
ATTORNEY April 25, 1961   C. W. VAN RANST   2,981,373
GEAR DRIVE Filed Nov. 5, 1958   2 Sheets-Sheet 2

INVENTOR.
CORNELIUS W. VAN RANST
BY
FINN G. OLSEN
ATTORNEY

United States Patent Office 2,981,373
Patented Apr. 25, 1961

2,981,373
GEAR DRIVE

Cornelius W. Van Ranst, 15692 Woodland Drive, Dearborn, Mich.

Filed Nov. 5, 1958, Ser. No. 772,138

3 Claims. (Cl. 184—11)

The present invention relates to a V-gear drive adapted primarily, but not exclusively for marine use, and more particularly to the lubricating system in such a gear drive.

It is conventional practice in constructing marine power boats to mount the engine on a bed with the drive shaft extending forward to a V-type gear drive, and have the propeller shaft extend rearwardly from said gear drive.

It is the principal object to provide an improved gear drive of this type which is characterized by the simplicity of its construction and the unique way provided for lubricating the moving parts and bearings.

It is another object of the present invention to provide a gear drive of the foregoing character which includes a simple construction for transferring lubricating oil from the housing of the gear drive to each of the parts to be lubricated.

It is still another object of the present invention to provide an improved gear drive of the foregoing character which uses an inclined disk rotatable in an enclosed casing to pump the lubricating oil to upper regions of the housing and which is positioned adjacent the lower bevel gear so as to pump maximum quantities of oil between the meshing gears of the gear drive.

It is still another object of the present invention to provide an improved gear drive of the foregoing character wherein a passageway is provided in the wall of the housing providing communication between the terminal ends of said shafts so that lubricating oil can flow by gravity from the upper bearing to the lower bearing supporting said terminal ends and from the lower bearing back to the sump of said housing.

It is still another object of the present invention to provide a gear drive which is characterized by its simple construction thereby assuring a relatively low cost unit.

Other objects of this invention will appear in the following description and appended claims, reference being had to the accompanying drawings forming a part of this specification wherein like reference characters designate corresponding parts in the several views.

In the drawings:

Figure 1 is a fragmentary side elevation showing a V-type gear drive mounted between a marine engine and a propeller shaft;

Figure 3 is a fragmentary elevational view of one section of the housing for the gear drive shown in Figures 1 and 2.

Figure 2:
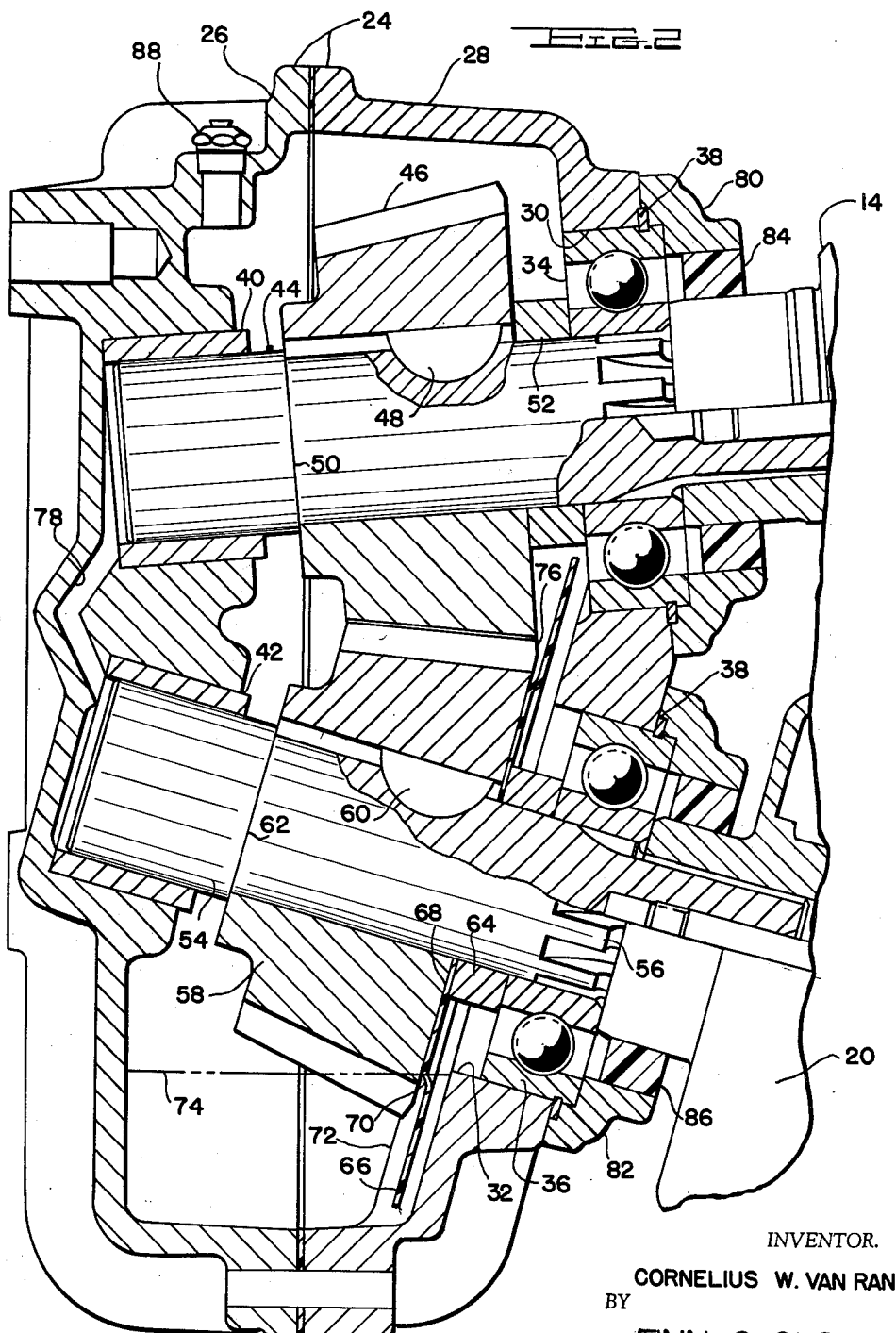
Figure 2 is an enlarged vertical section of the V-type gear drive shown in Figure 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the present invention will be given. Figure 1 illustrates at 10 the rear portion of a marine engine which is connected by a suitable drive shaft 12 and a universal joint 14 to the V-type gear drive 16. Positioned below the drive shaft 12 is a propeller shaft 18 which is connected to the gear drive 16 by a flexible coupling 20, which preferably is of the type illustrated and described in my copending application Serial No. 755,713, filed August 18, 1958, Patent No. 2,937,514. A suitable mounting member 22 supports the gear drive above the hull of the boat (not shown).

Referring now to Figures 2 and 3, the internal details of the gear drive 16 will be explained. The gear drive 16 includes a housing 24 having a front section 26 and a rear section 28. The latter has generally vertically disposed openings 30 and 32 in which are mounted the ball bearings 34 and 36, respectively. Each of the bearings 34 and 36 have snap rings 38 which limit the extent to which the bearings can enter the openings 30 and 32. In axial alignment respectively with the bearings 34 and 36 are the bushings 40 and 42 which are carried in the front wall of the front section 26.

Supported in bearings 34 and 40 is the driving shaft 44 which is drivingly connected by splines to the universal joint 14. A bevel gear 46 is keyed, as at 48, to the driving shaft 44 and seats against the shoulder 50 on shaft 44. A spacer ring 52 fits between the one side of bevel gear 46 and the inner race of ball bearing 34.

Supported in bearings 36 and 42 is a driven shaft 54 which is drivingly connected to the flexible coupling 20 by the splines 56. A bevel gear 58 is keyed, as at 60, to the driven shaft 54 and is seated aaginst the shoulder 62 formed on driven shaft 54. A spacer ring 64 fits between the bevel gear 58 and the inner race of the ball bearing 36. Clamped between the spacer ring 64 and the lower side of the bevel gear 58 is an annular disk 66.

The annular disk 66 has a radially inner portion 68 which fits flush with the lower side of the bevel gear 58, and the disk 66 is then axially offset at 70 so that the radially outer portion of disk 66 is axially displaced from the plane of the radially inner portion 68. It will be observed that the disk 66 extends radially beyond the bevel gear 58 terminating close to the cylindrical wall portion 72 which is integrally formed in the section 28 of housing 24. The cylindrical wall portion 72 is coaxially disposed relative to the disk 66 and extends around the lower half of disk 66.

During operation of the gear drive 16, the lower portion of the housing 24 will initially be filled with lubricating oil to the level 74. When the engine 10 is turned over, the gears 46 and 58, which are in mesh, will be turned, as will the shafts 44 and 54. Likewise, the annular disk 66 will rotate with bevel gear 58. The disk 66 will then act as a pumping element within the confines of the casing or cylindrical wall portion 72 causing lubricating oil to be carried upward and be thrown to the upper confines of housing and to the meshing gear teeth at 76.

In this respect, it is to be observed that the offset in disk 66 at 70 assures that an abundance of oil will be available at 76, and also, the offset 70 assures that there will be no contact with the teeth of the upper bevel gear 46. The oil which is thrown upward by the disk 66 will splash into the bushings and bearings for the shafts 44 and 54.

The upper shaft 44 is inclined downwardly toward the bushing 40 so that oil will flow to the bushing 40, and such oil that will pass therethrough can flow by gravity down the passageway 78, formed in the wall portion of front section 26 and communicating between the terminal ends of shafts 44 and 54. This oil may then pass through the bushing 42 and back to the bottom or sump of housing 24.

The housing 24 is normally a closed or sealed unit having annular cover plates 80 and 82 secured to the rear section 28 by bolts (not shown). Suitable sealing rings 84 and 86 fit between the cover plates 80 and 82 and the universal joint 14 and the flexible coupling 20, respectively. A suitable oil filling cap 88 which also serves as a breather vent is also provided for the housing 24.

From the foregoing it can be seen that a simple V-gear drive has been provided which has an efficient self contained lubricating system which because of its simplicity and novel arrangement of oil pumping and distributing elements provides a relatively low cost unit capable of efficient operation and long life.

Having thus described my invention, I claim:

1. In a gear drive for operatively connecting drive and driven shafts which are in a common vertical plane and angularly disposed to one another, the lower shaft being inclined upwardly and the upper shaft being inclined downwardly toward a common point, a gear housing in which said shafts are journaled with the adjacent shaft ends terminating in bearings in the one wall of said housing, said one wall having an oil passageway therein communicating between the terminal ends of said shafts, bevel gears on said shafts in mesh with one another, a disk carried on said lower shaft adjacent the lower side of the lower gear and extending radially beyond the teeth of such gear, said housing being closed so that lubricating oil can be filled therein to the lower bevel gear and on rotation of said shafts oil will be lifted by said disk to upper portions of said housing and splashed onto the upper shaft, and oil passing through the upper bearing will flow through said passageway to the lower bearing.

2. In a gear drive for operatively connecting drive and driven shafts which are in a common vertical plane and angularly disposed to one another, the lower shaft being inclined upwardly and the upper shaft being inclined downwardly toward a common point, a gear housing in which said shafts are journaled with the adjacent shaft ends terminating in bearings in the one wall of said housing, and one wall having an oil passageway therein communicating between the terminal ends of said shafts, bevel gears on said shafts in mesh with one another, a disk carried on said lower shaft adjacent the lower side of the lower gear and extending radially beyond the teeth of such gear, a cylindrical wall portion in said housing generally coaxially disposed with respect to said disk and enclosing the lower half thereof, said housing being closed so that lubricating oil can be filled therein to the lower bevel gear and on rotation of said shafts oil will be lifted by said disk from the space enclosed by said cylindrical wall portion to the upper portions of said housing and splashed onto the upper shaft and gear, and oil passing through the upper bearing will flow through said passageway to the lower bearing.

3. In a gear drive for operatively connecting drive and driven shafts which are in a common vertical plane and angularly disposed to one another, the lower shaft being inclined upwardly and the upper shaft being inclined downwardly toward a common point, a gear housing in which said shafts are journaled with the adjacent shaft ends terminating in bearings in the one wall of said housing, said one wall having an oil passageway therein communicating between the terminal ends of said shafts, bevel gears on said shafts in mesh with one another, a disk carried on said lower shaft adjacent the lower side of the lower gear and extending radially beyond the teeth of such gear, said disk having its radially inner portion in engagement with the hub of said lower gear and its radially outer portion axially offset from the teeth of said lower gear, a cylindrical wall portion in said housing generally coaxially disposed with respect to said disk and enclosing the lower half thereof, said housing being closed so that lubricating oil can be filled therein to the lower bevel gear and on rotation of said shafts oil will be lifted by said disk from the space enclosed by said cylindrical wall portion to the upper portions of said housing and splashed onto the upper shaft and gear, and oil passing through the upper bearing will flow through said passageway to the lower bearing.

References Cited in the file of this patent

UNITED STATES PATENTS

| | | |
|---|---|---|
| 1,262,798 | Huebotter | Apr. 16, 1918 |
| 1,474,491 | Perkins | Nov. 20, 1923 |
| 1,484,384 | Bock | Feb. 19, 1924 |
| 1,591,733 | Arnold | July 6, 1926 |
| 1,794,921 | Ramsey | Mar. 3, 1931 |
| 2,697,965 | Armitage | Dec. 28, 1954 |
| 2,750,806 | Hobbs | June 19, 1956 |